United States Patent
Takahashi et al.

(12)

(10) Patent No.: US 7,019,076 B2
(45) Date of Patent: Mar. 28, 2006

(54) TRANSPARENT RUBBER-MODIFIED COPOLYMER RESIN AND RESIN COMPOSITION CONTAINING THE SAME

(75) Inventors: Jun Takahashi, Chiba (JP); Jun Nakamoto, Chiba (JP); Hideki Watanabe, Chiba (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/491,434

(22) PCT Filed: Oct. 10, 2002

(86) PCT No.: PCT/JP02/10537

§ 371 (c)(1),
(2), (4) Date: Apr. 12, 2004

(87) PCT Pub. No.: WO03/033560

PCT Pub. Date: Apr. 24, 2003

(65) Prior Publication Data

US 2004/0249073 A1    Dec. 9, 2004

(30) Foreign Application Priority Data

Oct. 11, 2001  (JP) .............................. 2001-313618
Oct. 24, 2001  (JP) .............................. 2001-326163

(51) Int. Cl.
*C08L 51/04*        (2006.01)

(52) U.S. Cl. ........................... 525/71; 525/83; 525/316

(58) Field of Classification Search ................ 525/71, 525/83, 316
See application file for complete search history.

(56) References Cited

U.S. PATENT DOCUMENTS 4,146,589 A * 3/1979 Dupre ......................... 525/53
4,785,051 A * 11/1988 Henton ........................ 525/71

FOREIGN PATENT DOCUMENTS

| CN | 1152005 A | 6/1997 |
|---|---|---|
| JP | 8-269142 | 10/1996 |
| JP | 11-147993 | 6/1999 |
| JP | 11-322863 | 11/1999 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

The invention provides a rubber-modified copolymer resin which is excellent in transparency, impact resistance and rigidity and which has little dependency of the transparency on molding conditions, and a rubber-modified copolymer resin composition which has the above characteristics and which has high practical strength.

A transparent rubber-modified copolymer resin which is a rubber-modified copolymer resin obtained by copolymerizing a styrenic monomer and a (meth)acrylic ester monomer in the presence of a rubbery polymer, and which is characterized in that the volume mean particle diameter of rubber particles dispersed in the resin, is from 0.4 to 2.0 μm, and in the cumulative rubber particle size distribution curve by volume, the difference between the diameter at an integrated value of 75% and the diameter at an integrated value of 25%, is from 0.2 to 2.0 μm; and a rubber-modified copolymer resin composition comprising from 60 to 99.9 mass % of the transparent rubber-modified copolymer resin (A) and from 0.1 to 40 mass % of an emulsion graft copolymer (B).

16 Claims, 1 Drawing Sheet

TRANSPARENT RUBBER-MODIFIED COPOLYMER RESIN AND RESIN COMPOSITION CONTAINING THE SAME

TECHNICAL FIELD

The present invention relates to a rubber-modified copolymer resin which is excellent in transparency, impact resistance and rigidity and which has little dependency of the transparency on molding conditions, and a rubber-modified copolymer resin composition which has the above characteristics and which further has high practical strength.

BACKGROUND ART

Heretofore, transparent rubber-modified copolymer resins were employed in various applications including household electric products, packaging materials and optical applications. However, they were inadequate in transparency, impact resistance and rigidity, and they had dependency of the transparency on molding conditions. Thus, they were not satisfactory. Further, they were not adequate against a demand in recent market place for high practical strength.

For example, JP-A-4-180907 discloses a rubber-modified copolymer resin having the toluene-insoluble content, the swelling index, etc. adjusted within certain specific ranges, but for such a resin, it was required to use a specific styrene/butadiene copolymer or a specific reactor, and there was a problem such that the balance of the transparency, the impact resistance, the rigidity, etc. was not sufficient.

JP-A-8-269142 discloses a rubber-modified styrenic resin composition wherein a copolymer of a styrenic monomer and a (meth)acrylic ester monomer, constitutes a continuous phase, and rubber particles having two peaks constitute a dispersed phase, but its use was limited due to the facts that control of the rubber particle size distribution, the gel content, the swelling index, etc. was not sufficient, the dependency of the transparency on the molding conditions was large, and the practical strength was low.

JP-A-11-147993 discloses a rubber-modified styrenic resin composition wherein a copolymer of a styrenic monomer and a (meth)acrylic ester monomer constitutes a continuous phase and rubber particles having two peaks constitute a dispersed phase, and its molecular weight distribution is adjusted to be within a specific range. However, there was a problem that there were many particles having small particle diameters and low impact resistance, and the balance of the impact resistance and the rigidity was not sufficient.

It is an object of the present invention to provide a rubber-modified copolymer resin is excellent in transparency, impact resistance and rigidity and which has little dependency of the transparency on molding conditions, and a rubber-modified copolymer resin composition which has the above-mentioned characteristics and which further has excellent practical strength.

DISCLOSURE OF THE INVENTION

The present inventors have conducted an extensive study to solve such problems and as a result have arrived at the present invention on the basis of discovery that a rubber-modified copolymer resin having a specific rubber particle size distribution is excellent in transparency, impact resistance and rigidity and has little dependency of the transparency on molding conditions. Further, it has been found that among such rubber-modified copolymer resins, a rubber-modified copolymer resin having a specific gel content, swelling index and weight average molecular weight is further excellent in transparency, impact resistance and rigidity and has little dependency of the transparency on molding conditions.

Further, it has been found that a rubber-modified copolymer resin composition comprising such a rubber-modified copolymer resin and an emulsion graft copolymer, is excellent in transparency, impact resistance and rigidity and has little dependency of the transparency on molding conditions and further has high practical strength, whereby the present invention has been accomplished.

Namely, the present invention has the following characteristics.

(1) A transparent rubber-modified copolymer resin which is a rubber-modified copolymer resin comprising one type or a mixture of two or more types obtained by copolymerizing a styrenic monomer and a (meth)acrylic ester monomer in the presence of a rubbery polymer, and which is characterized in that the volume mean particle diameter (dv) of rubber particles dispersed in the resin, is from 0.4 to 2.0 μm, and in the cumulative rubber particle size distribution curve by volume, the difference between the diameter (d75) at an integrated value of 75% and the diameter (d25) at an integrated value of 25%, is from 0.2 to 2.0 μm.

(2) The transparent rubber-modified copolymer resin according to the above (1), wherein in the cumulative rubber particle size distribution curve by volume, rubber particles having particle diameters of less than 0.8 μm occupy from 95 to 30 vol %, and rubber particles having particle diameters of at least 0.8 μm occupy from 5 to 70 vol %.

(3) The transparent rubber-modified copolymer resin according to the above (1) or (2), wherein the cumulative rubber particle size distribution curve by volume has at least one peak value at each of a particle diameter of less than 0.8 μm and a particle diameter of at least 0.8 μm.

(4) The transparent rubber-modified copolymer resin according to any one of the above (1) to (3), which has a gel content of from 5 to 25 mass %.

(5) The transparent rubber-modified copolymer resin according to any one of the above (1) to (4), which has a swelling index is from 9 to 17.

(6) The transparent rubber-modified copolymer resin according to any one of the above (1) to (5), which has a weight average molecular weight (Mw) of 80,000 to 200,000.

(7) A rubber-modified copolymer resin composition characterized by comprising from 60 to 99.9 mass % of a transparent rubber-modified copolymer resin (A) which is a rubber-modified copolymer resin comprising one type or a mixture of two or more types obtained by copolymerizing a styrenic monomer and a (meth)acrylic ester monomer in the presence of a rubbery polymer, and which is characterized in that the volume mean particle diameter (dv) of rubber particles dispersed in the resin, is from 0.4 to 2.0 μm, and in the cumulative rubber particle size distribution curve by volume, the difference between the diameter (d75) at an integrated value of 75% and the diameter (d25) at an integrated value of 25%, is from 0.2 to 2.0 μm, and from 0.1 to 40 mass % of an emulsion graft copolymer (B).

(8) The transparent rubber-modified copolymer resin composition according to the above (7), wherein in the cumulative particle size distribution curve by volume of rubber particles dispersed in the transparent rubber-modified copolymer resin (A), rubber particles having particle diameters of less than 0.8 μm occupy from 95 to 30 vol %, and rubber particles having particle diameters of at least 0.8 μm occupy from 5 to 70 vol %.

(9) The transparent rubber-modified copolymer resin composition according to the above (7) or (8), wherein the cumulative particle size distribution curve by volume of rubber particles dispersed in the transparent rubber-modified copolymer resin (A), has at least one peak value at each of a particle diameter of less than 0.8 μm and a particle diameter of at least 0.8 μm.

(10) The rubber-modified copolymer resin composition according to any one of the above (7) to (9), wherein the difference in the refractive index at a temperature of 25° C. as between the transparent rubber-modified copolymer resin (A) and the emulsion graft copolymer (B), is less than 0.03.

In the present invention, the cumulative rubber particle size distribution curve by volume means a cumulative distribution curve by volume of the rubber particle size distribution showing the particle size on the abscissa and the volume fraction on the ordinate. Further, a frequency rubber particle size distribution curve means a frequency distribution curve by volume of the rubber particle size distribution showing the particle diameter on the abscissa and the volume fraction on the ordinate.

BEST MODE FOR CARRYING OUT THE INVENTION

Figure 1:
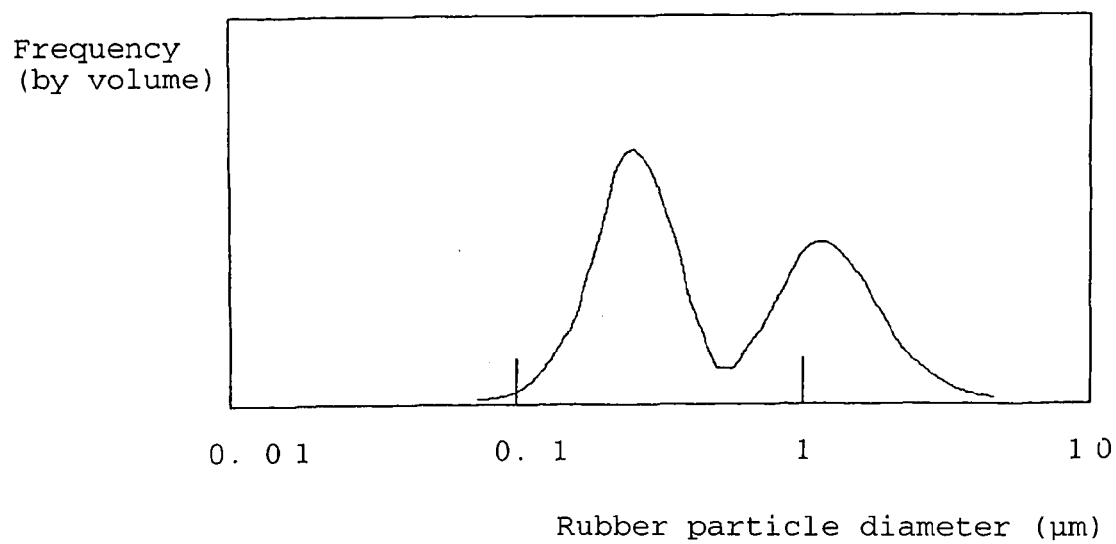
FIG. 1 is an example of the frequency rubber particle size distribution curve by volume of the transparent rubber-modified copolymer resin (A).

Now, the present invention will be described in detail.

Firstly, the transparent rubber-modified copolymer resin of the present invention will be described.

The transparent rubber-modified copolymer resin of the present invention is obtained by copolymerizing a styrenic monomer and a (meth)acrylic ester monomer in the presence of a rubbery polymer. The styrenic monomer to be used in the present invention may, for example, be styrene, α-methylstyrene, p-methylstyrene or p-t-butylstyrene, but is preferably styrene. Such styrenic monomers may be used alone or in combination as a mixture of two or more of them.

The (meth)acrylic ester monomer to be used in the present invention may, for example, be methyl methacrylate, ethyl methacrylate, methyl acrylate, ethyl acrylate, n-butyl acrylate, 2-methylhexyl acrylate, 2-ethylhexyl acrylate or octyl acrylate, but is preferably methyl methacrylate or n-butyl acrylate. Such (meth)acrylic ester monomers may be used alone or in combination as a mixture of two or more of them. However, it is most preferred to use methyl methacrylate and n-butyl acrylate in combination.

In the present invention, monomers other than the styrenic monomer and the (meth)acrylic acid ester monomer, such as acrylonitrile, maleic anhydride, methacrylic acid, etc., may be contained in an amount less than 50 parts by mass, per 100 parts by mass of the total amount of the styrenic monomer and the (meth)acrylic ester monomer.

The proportions of styrenic monomer and the (meth) acrylic ester monomer are preferably from 5 to 95 parts by mass of the styrenic monomer and from 95 to 5 parts by mass of the (meth)acrylic ester monomer, more preferably from 10 to 90 parts by mass of the styrenic monomer and from 90 to 10 parts by mass of the (meth)acrylic ester monomer. However, the total amount of the styrenic monomer and the (meth)acrylic ester monomer is 100 parts by mass. If the styrenic monomer and the (meth)acrylic ester monomer are outside such ranges, there may be a case where the transparency, etc. tend to be poor.

The rubbery polymer to be used in the present invention may, for example, be a polybutadiene, a styrene/butadiene rubber, a styrene/butadiene block rubber, a partially hydrogenated polybutadiene, a partially hydrogenated styrene/butadiene rubber or a partially hydrogenated styrene/butadiene block rubber, but is preferably a styrene/butadiene rubber or a styrene/butadiene block rubber having a styrene content of from 20 to 50 mass %. Further, the viscosity of a 5 mass % styrene solution of the rubbery polymer at a temperature of 25° C. is preferably from 15 to 200 mPa·s, more preferably from 20 to 60 mPa·s. The proportion of a 1,2-vinyl bond among unsaturated bonds based on butadiene is preferably from 8 to 25 mol %, more preferably from 12 to 16 mol %.

In the present invention, a polymer other than the rubbery polymer, such as a styrene/butadiene/styrene resin, may be incorporated, if it is less than 50 parts by mass per 100 parts by mass of the rubbery polymer.

The proportion of the rubbery polymer is preferably from 0.1 to 30 parts by mass, more preferably from 3 to 15 parts by mass, per 100 parts by mass of the total amount of the styrenic monomer and the (meth)acrylic ester monomer. If the rubbery polymer is outside the above range, there may be a case where the object cannot be accomplished such that the impact resistance, etc. are poor.

In the present invention, when the styrenic monomer and the (meth)acrylic ester monomer are to be polymerized in the presence of the rubbery polymer, the rubbery polymer is dissolved in the styrenic monomer and the (meth)acrylic ester monomer, followed by polymerization. The polymerization is carried out at a high temperature. The polymerization temperature is preferably from 80 to 170° C., more preferably from 100 to 160° C. Further, at the time of the polymerization, it is preferred to add a known polymerization initiator such as t-butylperoxy benzoate, t-butylperoxy-2-ethyl hexanoate, 1,1-bis(t-butylperoxy)-3,3,5-trimethylcyclohexane, 1,1-bis(t-butylperoxy)-cyclohexane, 2,2-bis(4,4-di-butylperoxycyclohexyl)propane, t-butylperoxyisopropyl monocarbonate, di-t-butylperoxide, dicumylperoxide, or ethyl-3,3-di-(t-butylperoxy) butylate, or a known molecular weight-controlling agent such as 4-methyl-2,4-diphenylpentene-1, t-dodecylmercaptan or n-dodecylmercaptan.

The amount of the polymerization initiator or the molecular weight-controlling agent is preferably from 0.005 to 5 parts by mass, more preferably from 0.01 to 1 part by mass, per 100 parts by mass of the total amount of the styrenic monomer and the (meth)acrylic ester monomer. If it is outside the above range, there may be a case where the object cannot be accomplished such that the impact resistance tends to be poor.

Further, at the time of the polymerization, a known crosslinking agent such as divinyl benzene or a known antioxidant such as octadecyl-3-(3,5-di-t-butyl-4-hydroxyphenyl) propionate, may also be added.

In the present invention, at the time of the polymerization, an organic solvent such as ethylbenzene or toluene is used preferably in an amount of from 0.1 to 50 parts by mass, more preferably in an amount of from 5 to 20 parts by mass, per 100 parts by mass of the total amount of the styrenic monomer and the (meth)acrylic ester monomer. By the use of the solvent, there may be a desired case where the viscosity during the polymerization tends to be low, and the polymerization control can be improved. Further, as a system for the polymerization in the present invention, a continuous polymerization system is preferred.

As described above, a transparent rubber-modified copolymer resin containing rubber particles as dispersed, is produced. The rubber particles have the following characteristics in the transparent rubber-modified copolymer resin of the present invention. Further, a rubber-modified copolymer resin containing rubber particles having such characteristics, may be constituted by one type of a rubber-modified copolymer resin obtained by copolymerizing the styrenic monomer and the (meth)acrylic ester monomer in the presence of the rubbery polymer, but may otherwise be constituted by mixing and melting two or more rubber-modified copolymer resins obtained separately and being different in the particle diameters of the rubber particles.

In the transparent rubber-modified copolymer resin of the present invention, the volume mean particle diameter (dv) of rubber particles contained as dispersed, is from 0.4 to 2 µm, preferably from 0.4 to 1.5 µm, more preferably from 0.5 to 1.2 µm. If the volume mean particle diameter (dv) of rubber particles is less than 0.4 µm, the resin tends to be poor in impact resistance, and if it exceeds 2 µm, the resin tends to be poor in transparency.

The volume means particle diameter (dv) in the present invention is a mean particle diameter to be obtained by the following Formula 1 by measuring particle diameters (=(long diameter+short diameter)/2) of about 1000 rubber particles in a photograph of an ultrathin specimen of the resin taken by a transmission electron microscope.

$$\text{Mean particle diameter} = \Sigma ni \cdot Di^4 / \Sigma ni \cdot Di^3 \qquad \text{Formula 1}$$

(wherein ni is the number of rubber particles having a particle size Di)

Further, rubber particles will be formed along with the progress of polymerization when the rubber-modified copolymer resin is produced, whereby control of the volume mean particle diameter (dv) of rubber particles is carried out by adjusting the stirring speed during the polymerization, the amount of the polymerization initiator or the molecular weight-controlling agent to be added or mixing of a rubber-modified copolymer resin having a different particle diameter.

Further, the rubber particles dispersed in the transparent rubber-modified copolymer resin of the present invention are characterized in that the difference between dv75 and dv25 (hereinafter represented by dv75–dv25) is from 0.2 to 2.0 µm, preferably from 0.4 to 1.7 µm, more preferably from 0.5 to 1.5 µm. If dv75-dv25 is less than 0.2 µm, the balance of the impact resistance and the rigidity tends to be poor, and if it exceeds 2.0 µm, the balance of the transparency and the rigidity tends to be poor, and further, the dependency of the transparency on molding conditions tends to be large. The control of dv75–dv25 is carried out, for example, by the stirring condition during the polymerization, the type or the amount of the polymerization initiator or the molecular weight-controlling agent, or mixing of a rubber-modified copolymer resin having a different particle diameter.

Further, dv75 and dv25 are particle diameters corresponding to integrated values of 75% and 25%, respectively, in the above-mentioned cumulative distribution curve by volume of the rubber particle size distribution showing the particle diameter on the abscissa and the volume fraction on the ordinate. Further, the rubber particle diameters are ones obtained by measuring the particle diameters from a photograph of an ultrathin specimen of the resin taken by a transmission electron microscope, in the same manner as for the volume mean particle diameter (dv) of the rubber particles. Further, the volume fraction is one represented by the volume fraction when the rubber particles obtained with such particle diameters are assumed to be spherical.

The rubber particles dispersed in the transparent rubber-modified copolymer resin of the present invention are preferably such that in the cumulative rubber particle size distribution curve by volume, rubber particles having particle diameters of less than 0.8 µm occupy from 95 to 30 vol %, and rubber particles having particle diameters of at least 0.8 µm occupy from 5 to 70 vol %. More preferably, those having particle diameters of less than 0.8 µm occupy from 80 to 40 vol %, and those having particle diameters of at least 0.8 µm occupy from 20 to 60 vol %. If those having particle diameters of less than 0.8 µm are from 95 to 30 vol %, and those having particle diameters of at least 0.8 µm are from 5 to 70 vol %, the resin will be further excellent in transparency, impact resistance and rigidity and will have less dependency of the transparency on molding conditions. The control of the ratio of those having particle diameters of less than 0.8 µm and those having particle diameters of at least 0.8 µm, can be carried out by adjusting the stirring conditions during the polymerization, the amount of the polymerization initiator or the molecular weight-controlling agent, mixing of a rubber-modified copolymer resin having a different particle diameter, etc.

The rubber particles dispersed in the transparent rubber-modified copolymer resin of the present invention are preferably such that the frequency rubber particle size distribution curve by volume of the rubber particle size distribution showing the particle diameter on the abscissa and the volume fraction on the ordinate as described above, has at least one peak value at each of a particle diameter of less than 0.8 µm and a particle diameter of at least 0.8 µm. If the distribution curve has at least one peak value at each of a particle diameter of less than 0.8 µm and a particle diameter of at least 0.8 µm, the resin will be further excellent in transparency, impact resistance and rigidity and has a less dependency of the transparency on molding conditions. The control to let the frequency rubber particle size distribution curve by volume have at least one peak value at each of a particle diameter of less than 0.8 µm and a particle diameter of at least 0.8 µm, can be carried out by adjusting the stirring condition during the polymerization, the type or amount of the polymerization initiator or the molecular weight controlling agent, mixing of a rubber-modified copolymer resin having a different particle diameter, etc.

As an example of the frequency rubber particle size distribution curve by volume, FIG. 1 shows an example of the frequency distribution by volume of the rubber particle diameter against logarithm.

The gel content of the transparent rubber-modified copolymer resin of the present invention is preferably from 5 to 25 mass %, more preferably from 15 to 23 mass %. If the gel content is less than 5 mass %, the impact resistance tends to be poor, and if the gel content exceeds 25 mass %, the transparency and the rigidity tend to be poor, and further, dependency of the transparency on molding conditions tends to be large. The adjustment of the gel content can be carried out by adjusting the stirring condition during the polymerization, the type or amount of the polymerization initiator or the molecular weight-controlling agent, etc.

Further, in the present invention, the gel content is measured as follows.

1 g of a sample is accurately weighed (a) and dissolved in 100 ml of methyl ethyl ketone (MEK) at a temperature of 25° C. over a period of 24 hours. Then, the solution is transferred to a centrifuging tube having the mass (b)

measured and centrifuged at a temperature of at most 10° C. at 14000 rpm for 40 minutes. After removing the supernatant by decantation, the rest is dried in a vacuum dryer at a temperature of 70° C. for 24 hours. The mass (c) of the centrifuging tube after the drying, is measured, whereupon the gel content is calculated by the following Formula 2.

Gel content (mass %)={(c−b)/a}×100  Formula 2

Further, the swelling index of the transparent rubber-modified copolymer resin of the present invention is preferably from 9 to 17, more preferably from 10 to 14. If the swelling index is less than 9, the impact resistance tends to be poor, and if the swelling index exceeds 17, the transparency and the rigidity tend to be poor, and further, the dependency of the transparency on molding conditions tends to be large. Control of the swelling index can be adjusted by an addition of an antioxidant, adjustment of the heating conditions in the devaporizer, etc.

Here, the swelling index in the present invention is measured as follows.

About 1 g of a sample is dissolved in 100 ml of toluene at a temperature of 25° C. over a period of 24 hours. Then, the solution is transferred to a centrifuging tube having the mass (d) measured and centrifuged at a temperature of at most 10° C. at 14000 rpm for 40 minutes. After removing the supernatant by decantation, the mass (e) of the centrifuging tube after drying is measured. It is dried in a vacuum dryer at a temperature of 70° C. for 24 hours. The mass (f) of the centrifuging tube after the drying, is measured, and the swelling index is calculated by the following Formula 3.

Swelling index=(e−d)/(f−d)  Formula 3

The weight average molecular weight (Mw) of the transparent rubber-modified copolymer resin of the present invention is preferably from 80,000 to 200,000, more preferably from 100,000 to 160,000. If Mw is less than 80,000, the impact resistance tends to be poor, and if it exceeds 200,000, the transparency tends to decrease, and further, the dependency of the transparency on molding conditions tends to be large. Control of Mw can be adjusted by the type or amount of the polymerization initiator or the molecular weight-controlling agent, the temperature condition for polymerization, etc.

To the transparent rubber-modified copolymer resin of the present invention, it is possible to add additives such as an antioxidant, a weather-resistant agent, a lubricant, a plasticizer, a coloring agent, an antistatic agent, a mineral oil, a flame retardant, etc., as the case requires, and they may be added at an optional stage during the production. The method for adding such additives is not particularly limited. However, a method of adding during the polymerization, or a method of melt-kneading them by an extruder, may, for example, be mentioned.

The transparent rubber-modified copolymer resin of the present invention will be pressed into various molded products by conventional methods such as injection molding, extrusion molding, compression molding, vacuum molding, etc. and then, practically used. Now, a composition comprising the rubber-modified copolymer resin of the present invention will be described in detail.

The rubber-modified copolymer resin composition in the present invention comprises the above-mentioned transparent rubber-modified copolymer resin (A) and an emulsion graft copolymer (B).

The transparent rubber-modified copolymer resin (A) has already been described in detail, and, now, the emulsion graft copolymer (B) will be described.

As the emulsion graft copolymer (B), one readily available in the market, for example, as Kureha BTA, manufactured by Kureha Chemical Industry Co., Ltd. or as カネエース manufactured by Kaneka Corporation, may be used. Otherwise, it may be one obtained by a conventional emulsion polymerization method.

For example, it is possible to employ a method for obtaining it by emulsion graft polymerizing a styrenic monomer and/or a (meth)acrylic ester monomer, to a latex of the rubbery polymer as described with respect to the transparent rubber-modified copolymer resin (A), i.e. a butadiene or styrene/butadiene latex. Further, as the case requires, it is possible to employ a method for graft polymerizing a vinyl type monomer copolymerizable with such monomers.

Specifically, in the presence of a rubbery polymer latex, emulsion graft polymerization is carried out by using a styrenic monomer and/or a (meth)acrylic ester monomer. The amount of the rubbery polymer may be one obtained by using it in an amount of more than 30 parts by mass and not more than 500 parts by mass, per 100 parts by mass of the total of the styrenic monomer and/or the (meth)acrylic ester monomer.

If the rubbery polymer is less than 30 parts by mass, the practical strength of the rubber-modified copolymer resin composition tends to be low. Further, if the rubbery polymer exceeds 500 parts by mass, the dependency of the transparency on molding conditions is more likely to result.

The ratio of the transparent rubber-modified copolymer resin (A) to the emulsion graft copolymer (B) is from 99.9 to 60 mass %: from 0.1 to 40 mass %, preferably from 95 to 70 mass %: from 5 to 30 mass %, more preferably from 90 to 75 mass % from 10 to 25 mass %. If the emulsion graft copolymer (B) is less than 0.1 mass %, the practical strength tends to be poor, and if it exceeds 40 mass %, the rigidity tends to be low.

The rubber-modified copolymer resin composition may comprise two or more transparent rubber-modified copolymer resins (A) and two or more emulsion graft copolymers (B).

Further, as the transparent rubber-modified copolymer resin (A) constituting the resin composition of the present invention, a rubber-modified copolymer resin (A) is selected wherein the volume mean particle diameter (dv) of rubber particles dispersed in the rubber-modified copolymer resin, is from 0.5 to 2.0 µm, and in the cumulative rubber particle size distribution curve by volume, the difference between the diameter (dv75) at an integrated value of 75 and the diameter (dv25) at an integrated value of 25%, is from 0.2 to 2.0 µm.

The volume mean particle size of rubber particles dispersed in the transparent rubber-modified copolymer resin (A) is preferably from 0.6 to 1.7 µm, more preferably from 0.7 to 1.5 µm. If the volume mean particle size of rubber particles is less than 0.5 µm, the impact resistance or the practical strength of the rubber-modified copolymer resin composition tends to be low, and if it exceeds 2.0 µm, the transparency tends to be poor.

Further, the difference between dv75 and dv25 is preferably from 0.4 to 1.7 µm, more preferably from 0.5 to 1.5 µm. If dv75−dv25 is less than 0.2 µm, the balance of the impact resistance and the rigidity, and the practical strength of the rubber-modified copolymer resin composition tend to be poor, and if it exceeds 2.0 µm, the balance of the transparency and the rigidity, tends to be poor, and further, the dependency of the transparency on molding conditions tends to be large.

The rubber particles dispersed in the transparent rubber-modified copolymer resin (A) are preferably such that in the cumulative rubber particle size distribution curve by volume, those having particle diameters of less than 0.8 μm occupy from 95 to 30 vol %, and those having particle diameters of at least 0.8 μm occupy from 5 to 70 vol %. More preferably, those having particle diameters of less than 0.8 μm occupy from 80 to 40 vol %, and those having particle diameters of at least 0.8 μm occupy from 20 to 60 vol %. Still further, if those having particle diameters of less than 0.8 μm are from 95 to 30 vol %, and those having particle diameters of at least 0.8 μm are from 5 to 70 vol %, the rubber-modified copolymer resin composition will be further excellent in transparency, impact resistance and rigidity, and has less dependency of the transparency on molding conditions, and its practical strength will be high.

Further, as mentioned above, the rubber particles dispersed in the transparent rubber-modified copolymer resin (A) preferably have at least one peak value at each of a particle diameter of less than 0.8 μm and a particle diameter of at least 0.8 μm, in the frequency particle size distribution curve by volume of the rubber particle size distribution showing the rubber particle diameter on the abscissa and the volume fraction on the ordinate. If it has at least one peak value at each of a particle diameter of less than 0.8 μm and a particle diameter of at least 0.8 μm, the rubber-modified copolylmer resin composition will be further excellent in transparency, impact resistance and rigidity and will have less dependency of the transparency on molding conditions and higher practical strength.

Further, the difference in the refractive index at a temperature of 25° C. as between the transparent rubber-modified copolymer resin (A) and the emulsion graft copolymer (B) is preferably less than 0.03, more preferably less than 0.02. If the difference in the refractive index is at least 0.03, the transparency deteriorates substantially, such being undesirable.

Here, for the refractive index of the present invention, the compositional ratio of the constituting monomer units is measured by a compositional analysis, and the refractive index is obtained by calculation by means of the following Formula 4.

$$n = X_A \times n_A + X_B \times n_B + X_C \times n_C +$$ Formula 4

Namely, in a case where the composition of monomer units comprises Am monomer: $X_A$, Bm monomer: $X_B$ and Cm monomer: $X_C$ (provided that $X_A + X_B + X_C = 1$ by mass ratio), $n_A$ represents the refractive index of a polymer made of the Am monomer, $n_B$ the refractive index of a polymer made of the Bm monomer, and $n_C$ the refractive index of a polymer made of the Cm monomer, and they are substituted for the above Formula to obtain the refractive index by calculation. Here, the analysis of the composition can be carried out by a known method such as pyrolytic gas chromatography.

The transparent rubber-modified copolymer resin (A) and the emulsion graft copolymer (B) may be mixed by a known method to obtain a rubber-modified copolymer resin composition. For example, a method of melt kneading them by means of an extruder may be mentioned.

To the rubber-modified copolymer resin composition of the present invention, it is possible to add additives such as an antioxidant, a weather resistant agent, a lubricant, a plasticizer, a coloring agent, an antistatic agent, a mineral oil, a flame retardant, etc., as the case requires, and they may be added at an optional stage during the production. A method for adding such additives, is not particularly limited.

However, there may, for example, be mentioned a method of adding them during polymerization of each resin or copolymer, or a method of melt-kneading them by an extruder during the production of the resin composition.

The rubber-modified copolymer resin composition of the present invention may be processed into various molded products by a known method such as injection molding, extrusion molding, compression molding or vacuum forming.

EXAMPLES

Now, the present invention will be described with reference to Examples, but it should be understood that the present invention is by no means restricted to such Examples.

(1) Examples for transparent rubber-modified copolymer resins

Reference Example 1

A first completely mixing type reactor having a capacity of about 5L and equipped with a stirrer, a second completely mixing type reactor having a capacity of 15L and equipped with a stirrer, a column plug flow type reactor having a capacity of about 40L and a devaporizer equipped with a preheater, were connected in series. A starting material solution was prepared by mixing 14 parts by mass of ethylbenzene, 0.05 part by mass of t-butylperoxyisopropyl monocarbonate (the temperature for a half life period of one hour: 118° C.), 0.1 part by mass of t-dodecylmercaptan and 0.1 part by mass of octadecyl-3-(3,5-di-t-butyl-4-hydroxyphenyl) propionate to a monomer solution comprising 8 parts by weight of Asaprene 670A manufactured by Asahi Kasei Corporation as a rubbery polymer (a styrene/butadiene rubber, styrene content: 40 mass %, viscosity of a 5 mass % styrene solution at a temperature of 25° C.: 33 mPa·s, and proportion of 1,2-vinyl bond: 13.9 mol %), 56 parts by mass of styrene, 39 parts by mass of methyl methacrylate (hereinafter MMA), and 5 parts by mass of n-butyl acrylate (hereinafter n-BA). This starting material solution was introduced into the first completely mixing type reactor controlled at a temperature of 110° C. at a rate of 7 kg/hr and then continuously supplied to the second completely mixing type reactor controlled at a temperature of 130° C. Then, the polymerized solution was continuously withdrawn from the second completely mixing type reactor and introduced into the column plug flow type reactor adjusted so that the temperature gradient would be from 130° C. to 150° C. in the flow direction. While heating this polymerized solution by the preheater, it was introduced into the devaporizer having the pressure reduced to 1.3 kPa, whereby a vapor content such as an unreacted monomer, was removed at a devaporizer internal temperature of 230° C. This resin solution was withdrawn by a gear pump, extruded in the form of a strand and cut to obtain a resin in the form of pellets. By controlling the rubber particle diameters by changing the stirring speed in the second completely mixing type reactor, samples A to E were obtained. Table 1 shows the results of evaluation of the physical properties.

Reference Example 2

The operation was carried out in the same manner as in Reference Example 1 except that the first completely mixing type reactor was not used, and the starting material solution having no t-butylperoxyisopropylmonocarbonate added, was directly supplied to the second completely mixing type reactor. By controlling the rubber particle diameters by changing the stirring speed in the second completely mixing type reactor, samples F to G were obtained. Table 1 shows the results of evaluation of the physical properties.

Reference Example 3

The operation was carried out in the same manner as in Reference Example 1 except that t-dodecylmercaptan was changed to 0.02 part by mass, and the starting material solution was prepared by mixing 0.1 part by mass of 4,6-bis(octylthiomethyl)-o-cresol instead of octadecyl-3-(3, 5-di-t-butyl-4-hydroxyphenyl) propionate, whereby sample H was obtained. Table 1 shows the results of evaluation of the physical properties.

TABLE 1

|  | Sample identification | Average particle diameter (μm) of rubber particles |
|---|---|---|
| Reference Example 1 | A | 0.2 |
|  | B | 0.5 |
|  | C | 0.7 |
|  | D | 1.1 |
|  | E | 2.8 |
| Reference Example 2 | F | 0.5 |
|  | G | 1.1 |
| Reference Example 3 | H | 0.5 |

Examples 1 to 6 and Comparative Examples 1 to 4

The blend as shown in Table 2, 3 or 4 was extruded in the form of a strand at a temperature of 230° C. by means of a 40 mm single screw extruder and then cut by a pelletizer to obtain a rubber-modified copolymer resin in the form of pellets. Further, the results of evaluation of the physical properties are shown in Tables 2, 3 and 4.

TABLE 2

|  |  | Example 1 | Example 2 | Example 3 |
|---|---|---|---|---|
| Blend type |  | B/D | B/D | B/D |
| Blend ratio (parts by mass) |  | 60/40 | 40/60 | 80/20 |
| dv (μm) |  | 0.8 | 1.0 | 0.7 |
| dv75 (μm) |  | 1.1 | 1.2 | 1.0 |
| dv25 (μm) |  | 0.4 | 0.5 | 0.4 |
| dv75–dv25 (μm) |  | 0.7 | 0.7 | 0.6 |
| Less than 0.8 μm (vol %) |  | 70 | 45 | 82 |
| At least 0.8 μm (vol %) |  | 30 | 55 | 18 |
| Peak at less than 0.8 μm |  | One peak | One peak | One peak |
| Peak at at least 0.8 μm |  | One peak | One peak | Nil |
| Gel content (mass %) |  | 16 | 17 | 15 |
| Swelling index |  | 12 | 12 | 12 |
| Weight average molecular weight (Mw) |  | 140,000 | 140,000 | 140,000 |
| 200° C. molded product | Total light transmittance (%) | 91 | 91 | 91 |
|  | Haze (%) | 2.8 | 3.9 | 2.6 |
| 230° C. molded product | Total light transmittance (%) | 91 | 91 | 91 |
|  | Haze (%) | 1.9 | 2.5 | 1.9 |
| Izod impact strength (J/m) |  | 111 | 120 | 99 |
| Flexural modulus (MPa) |  | 2560 | 2520 | 2570 |

TABLE 3

|  |  | Example 4 | Example 5 | Example 6 |
|---|---|---|---|---|
| Blend type |  | F/G | H/D | B/D/E |
| Blend ratio (parts by mass) |  | 60/40 | 80/20 | 60/20/20 |
| dv (μm) |  | 0.8 | 0.7 | 1.0 |
| dv75 (μm) |  | 1.1 | 1.0 | 1.6 |
| dv25 (μm) |  | 0.4 | 0.4 | 0.4 |
| dv75–dv25 (μm) |  | 0.7 | 0.6 | 1.2 |
| Less than 0.8 μm (vol %) |  | 70 | 82 | 65 |
| At least 0.8 μm (vol %) |  | 30 | 18 | 35 |
| Peak at less than 0.8 μm |  | One peak | One peak | One peak |
| Peak at at least 0.8 μm |  | One peak | Nil | Two peaks |
| Gel content (mass %) |  | 14 | 14 | 17 |
| Swelling index |  | 12 | 16 | 12 |
| Weight average molecular weight (Mw) |  | 140,000 | 170,000 | 140,000 |
| 200° C. molded product | Total light transmittance (%) | 91 | 90 | 90 |
|  | Haze (%) | 3.9 | 4.5 | 4.5 |
| 230° C. molded product | Total light transmittance (%) | 91 | 91 | 91 |
|  | Haze (%) | 1.9 | 2.8 | 2.8 |
| Izod impact strength (J/m) |  | 92 | 113 | 128 |
| Flexural modulus (MPa) |  | 2560 | 2570 | 2550 |

TABLE 4

|  |  | Comp. Ex. 1 | Comp. Ex. 2 | Comp. Ex. 3 | Comp. Ex. 4 |
|---|---|---|---|---|---|
| Blend type |  | C | E | A/E | A/D |
| Blend ratio (parts by mass) |  | 100 | 100 | 60/40 | 95/5 |
| dv (μm) |  | 0.7 | 2.8 | 0.9 | 0.3 |
| dv75 (μm) |  | 0.7 | 2.9 | 2.6 | 0.4 |
| dv25 (μm) |  | 0.6 | 2.7 | 0.2 | 0.2 |
| dv75–dv25 (μm) |  | 0.1 | 0.2 | 2.4 | 0.1 |
| Less than 0.8 μm (vol %) |  | 70 | 1 | 60 | 96 |
| At least 0.8 μm (vol %) |  | 30 | 99 | 40 | 4 |
| Peak at less than 0.8 μm |  | One peak | Nil | One peak | One peak |
| Peak at at least 0.8 μm |  | Nil | One peak | One peak | One peak |
| Gel content (mass %) |  | 15 | 16 | 16 | 13 |
| Swelling index |  | 12 | 12 | 12 | 12 |
| Weight average molecular weight (Mw) |  | 140,000 | 140,000 | 140,000 | 140,000 |
| 200° C. molded product | Total light transmittance (%) | 91 | 89 | 89 | 91 |
|  | Haze (%) | 2.6 | 15.5 | 9.1 | 2.6 |
| 230° C. molded product | Total light transmittance (%) | 91 | 90 | 90 | 91 |
|  | Haze (%) | 1.9 | 9.8 | 4.3 | 1.9 |
| Izod impact strength (J/m) |  | 58 | 97 | 104 | 52 |
| Flexural modulus (MPa) |  | 2550 | 2550 | 2550 | 2560 |

Each of Examples relating to the transparent rubber-modified copolymer resin of the present invention, was excellent in transparency, impact resistance and rigidity and had little dependency of the transparency on molding conditions, while each of Comparative Examples which do not meet the conditions of the present invention, was poor in some physical property among transparency, impact resistance, rigidity and dependency of the transparency on molding conditions.

(2) Examples for the rubber-modified copolymer resin composition

Reference Example 4

A first completely mixing type reactor having a capacity of about 5L and equipped with a stirrer, a second completely mixing type reactor having a capacity of about 15L and equipped with a stirrer, a column plug flow type reactor having a capacity of about 40L and a devaporizer equipped with a preheater, were connected in series. A starting material solution was prepared by mixing 15 parts by mass of ethylbenzene, 0.05 part by mass of t-butylperoxyisopropyl monocarbonate, 0.15 part by mass of t-dodecylmercaptan, and 0.1 part by mass of octadecyl-3-(3,5-di-t-butyl-4-hydroxyphenyl) propionate to a monomer solution comprising 10 parts by mass of Asaprene 670A manufactured by Asahi Kasei Corporation as a rubbery polymer (styrene/butadiene rubber, styrene content: 40 mass %, viscosity of a 5 mass % styrene solution at a temperature of 25° C.: 33 mPa·s, proportion of 1,2-vinyl bond: 13.9 mol %), 56 parts by mass of styrene, 39 parts by mass of methyl methacrylate (hereinafter (MMA)), and 5 parts by mass of n-butyl acrylate (hereinafter n-BA). This starting material solution was introduced into the first completely mixing type reactor controlled at a temperature of 110° C. at a rate of 7 kg/hr and then continuously supplied to the second completely mixing type reactor controlled at a temperature of 130° C. The rubber particle diameters were controlled by the stirring speed in the second completely mixing type reactor. Then, the polymerized solution was continuously withdrawn from the second completely mixing type reactor and introduced into the column plug flow type reactor adjusted so that the temperature gradient would be from 130° C. to 150° C. in the flow direction. While heating this polymerized solution by the preheater, it was introduced into the devaporizer having the pressure reduced to 1.3 kPa, and a vapor content such as an unreacted monomer was removed at a devaporizer internal temperature of 230° C. This resin solution was withdrawn by a gear pump, extruded in the form of a strand and cut to obtain a resin in the form of pellets. By controlling the rubber particle diameters by changing the stirring speed in the second completely mixing type reactor, samples A' to E' were obtained. Table 5 shows the results of evaluation of the physical properties.

Reference Example 5

The operation was carried out in the same manner as in Reference Example 4 except that the first completely mixing type reactor was not used, and the starting material solution having no t-butylperoxyisopropyl monocarbonate added, was directly supplied to the second completely mixing type reactor. By controlling the rubber particle diameters by changing the stirring speed in the second completely mixing type reactor, samples F' to G' were obtained. Table 5 shows the results of evaluation of the physical properties.

Reference Example 6

The operation was carried out in the same manner as in Reference Example 4 except that the starting material solution was prepared by mixing 0.1 part by mass of 4,6-bis (octylthiomethyl)-o-cresol instead of octadecyl-3-(3,5-di-t-butyl-4-hydroxyphenyl) propionate, whereby sample H was obtained. Table 5 shows the results of evaluation of the physical properties.

TABLE 5

| | Sample identification | Average particle diameter (μm) of rubber particles |
|---|---|---|
| Reference Example 4 | A' | 0.2 |
| | B' | 0.5 |
| | C' | 0.7 |
| | D' | 1.1 |
| | E' | 2.8 |
| Reference Example 5 | F' | 0.5 |
| | G' | 1.1 |
| Reference Example 6 | H' | 0.5 |

Reference Example 7

The blend as identified in Table 6 or 7 was extruded in the form of a strand at a temperature of 230° C. by means of a 40 mm single screw extruder and cut by a pelletizer to obtain a rubber-modified copolymer resin (A) in the form of pellets. The results of evaluation of the physical properties are shown in Tables 6 and 7.

Here, the refractive index calculated from the composition of monomer units constituting the obtained resin, was obtained in such a manner that the compositional ratio of monomer units constituting the rubber-modified copolymer resin (A) was measured by the analysis of the composition, and the refractive index was obtained by calculation by means of the above-mentioned Formula 4 on the basis that the refractive indices of styrene, methyl methacrylate, n-butyl acrylate and butadiene monomers are 1.595, 1.494, 1.463 and 1.518, respectively. In each case, the refractive index was 1.548.

TABLE 6

| Test number | 2-1 | 2-2 | 2-3 | 2-4 | 2-5 |
|---|---|---|---|---|---|
| Blend type | B'/D' | B'/D' | B'/D' | F'/G' | H'/D' |
| Blend ratio (parts by mass) | 60/40 | 40/60 | 80/20 | 60/40 | 80/20 |
| dv (μm) | 0.8 | 1.0 | 0.7 | 0.8 | 0.7 |
| dv75 (μm) | 1.1 | 1.2 | 1.0 | 1.1 | 1.0 |
| dv25 (μm) | 0.4 | 0.5 | 0.3 | 0.4 | 0.3 |
| dv75–dv25 (μm) | 0.7 | 0.7 | 0.7 | 0.7 | 0.7 |
| Less than 0.8 μm (vol %) | 68 | 45 | 83 | 68 | 83 |
| At least 0.8 μm (vol %) | 32 | 55 | 17 | 32 | 17 |
| Peak at less than 0.8 μm | One peak | One peak | One peak | One peak | One peak |
| Peak at at least 0.8 μm | One peak | One peak | Nil | One peak | Nil |
| Gel content (mass %) | 18 | 19 | 18 | 17 | 17 |
| Swelling index | 12 | 12 | 12 | 12 | 16 |
| Mw | 130,000 | 130,000 | 130,000 | 130,000 | 160,000 |

TABLE 7

| Test number | 2-6 | 2-7 | 2-8 | 2-9 | 2-10 |
|---|---|---|---|---|---|
| Blend type | B'/D'/E' | C' | E' | A'/E' | A'/D' |
| Blend ratio (parts by mass) | 60/20/20 | 100 | 100 | 60/40 | 95/5 |
| dv (μm) | 1.0 | 0.7 | 2.8 | 0.9 | 0.3 |

TABLE 7-continued

| Test number | 2-6 | 2-7 | 2-8 | 2-9 | 2-10 |
|---|---|---|---|---|---|
| dv75 (μm) | 1.6 | 0.7 | 2.9 | 2.6 | 0.4 |
| dv25 (μm) | 0.4 | 0.6 | 2.7 | 0.2 | 0.2 |
| dv75–dv25 (μm) | 1.2 | 0.1 | 0.2 | 2.4 | 0.1 |
| Less than 0.8 μm (vol %) | 65 | 68 | 1 | 60 | 96 |
| At least 0.8 μm (vol %) | 35 | 32 | 99 | 40 | 4 |
| Peak at less than 0.8 μm | One peak | One peak | Nil | One peak | One peak |
| Peak at at least 0.8 μm | Two peaks | Nil | One peak | One peak | One peak |
| Gel content (mass %) | 19 | 17 | 18 | 18 | 15 |
| Swelling index | 12 | 12 | 12 | 12 | 12 |
| Mw | 130,000 | 130,000 | 130,000 | 130,000 | 130,000 |

Reference Example 8

Into an autoclave having a capacity of 200 liter, 115 kg of pure water, 500 g of potassium oleate, 75 g of sodium pyrophosphate, 1.5 g of ferrous sulfate, 2.2 g of sodium ethylenediamine tetraacetate and 22 g of Rongalite were added and uniformly dissolved with stirring. Then, 20.0 kg of styrene, 30.0 kg of butadiene, 148 g of t-dodecylmercaptan, 30 g of divinyl benzene and 96 g of diisopropylbenzene hydroperoxide were added, and a reaction was carried out at a temperature of 50° C. for 16 hours with stirring to complete polymerization thereby to obtain a rubbery polymer latex. To the obtained rubbery polymer latex, 45 g of sodium sulfosuccinate was added and sufficiently stabilized, whereupon a 0.2% hydrochloric acid aqueous solution and a 2% sodium hydroxide aqueous solution were added from separate nozzles so as to maintain the pH of the latex to be from 8 to 9, whereby the latex was flocculated and grown to obtain a rubbery elastomer latex having an average particle diameter of 0.42 μm. This rubbery elastomer latex was weighed to be 30 kg as calculated as the solid content and transferred to an autoclave having a capacity of 200L, whereupon 80 kg of pure water was added, and the temperature was raised to 50° C. in a nitrogen stream with stirring. Added thereto was 2 kg of pure water having 1.25 g of ferrous sulfate, 2.5 g of sodium ethylenediamine tetraacetate and 100 g of Rongalite dissolved. A mixture comprising 16 kg of styrene, 14 kg of methyl methacrylate and 60 g of t-dodecylmercaptan, and a solution having 120 g of diisopropylbenzene hydroperoxide dispersed in 8 kg of pure water containing 450 g of potassium oleate, were separately continuously added over a period of 6 hours. After completion of the addition, the temperature was raised to 70° C., and 30 g of diisopropylbenzene hydroperoxide was further added. Then, the mixture was left to stand for 2 hours to complete the polymerization.

To the obtained emulsion, an antioxidant was added, followed by dilution with pure water to a solid content of 15 mass %. Then, the temperature was raised to 60°c, and while vigorously stirring, dilute sulfuric acid was added for salting out. Thereafter, the temperature was raised to 90° C. for coagulation, followed by dehydration, washing with water and drying to obtain a powdery emulsion graft copolymer (B).

The compositional ratio of the monomer units constituting the obtained emulsion graft copolymer (B) was measured, and the refractive index calculated by means of the above-mentioned Formula 4, was 1.548.

Examples 7 to 13 and Comparative Examples 5 to 9

The blend as shown in Table 8 or 9 was extruded in the form of a strand at a temperature of 230° C. by means of a 35 mm twin screw extruder and cut by a pelletizer to obtain a rubber-modified copolymer resin composition in the form of pellets. The results of evaluation of the physical properties are shown in Tables 8 and 9.

TABLE 8

| | | Ex. 7 | Ex. 8 | Ex. 9 | Ex. 10 | Ex. 11 | Ex. 12 | Ex. 13 |
|---|---|---|---|---|---|---|---|---|
| Rubber-modified copolymer resin | Test number | 2-1 | 2-2 | 2-3 | 2-4 | 2-5 | 2-6 | 2-1 |
| | Mass % | 90 | 90 | 90 | 90 | 90 | 90 | 80 |
| Emulsion graft amount (mass %) | | 10 | 10 | 10 | 10 | 10 | 10 | 20 |
| 200° C. molded product | Total light transmittance (%) | 90 | 90 | 90 | 90 | 89 | 90 | 90 |
| | Haze (%) | 3.2 | 4.5 | 3.0 | 4.5 | 4.9 | 3.9 | 3.0 |
| 230° C. molded product | Total light transmittance (%) | 91 | 90 | 91 | 91 | 90 | 91 | 91 |
| | Haze (%) | 2.4 | 3.0 | 2.3 | 2.5 | 3.3 | 2.7 | 2.2 |
| Izod impact strength (J/m) | | 152 | 154 | 134 | 130 | 141 | 150 | 195 |
| Falling weight strength (cm) | | 45 | 47 | 38 | 35 | 40 | 43 | 75 |
| Flexural modulus (MPa) | | 2410 | 2380 | 2400 | 2450 | 2450 | 2380 | 2280 |

TABLE 9

| | | Comp. Ex. 5 | Comp. Ex. 6 | Comp. Ex. 7 | Comp. Ex. 8 | Comp. Ex. 9 |
|---|---|---|---|---|---|---|
| Rubber-modified copolymer resin | Test number | 2-1 | 2-7 | 2-8 | 2-9 | 2-10 |
| | Mass % | 100 | 90 | 90 | 90 | 90 |
| Emulsion graft amount (mass %) | | 0 | 10 | 10 | 10 | 10 |
| 200° C. molded product | Total light transmittance (%) | 90 | 90 | 88 | 88 | 90 |
| | Haze (%) | 3.2 | 3.2 | 17.3 | 10.3 | 3.2 |
| 230° C. molded product | Total light transmittance (%) | 91 | 91 | 89 | 89 | 91 |
| | Haze (%) | 2.4 | 2.4 | 8.6 | 5.6 | 2.4 |

TABLE 9-continued

|  | Comp. Ex. 5 | Comp. Ex. 6 | Comp. Ex. 7 | Comp. Ex. 8 | Comp. Ex. 9 |
|---|---|---|---|---|---|
| Izod impact strength (J/m) | 112 | 61 | 95 | 105 | 58 |
| Falling weight strength (cm) | 8 | 23 | 29 | 30 | 23 |
| Flexural modulus (MPa) | 2410 | 2400 | 2380 | 2370 | 2400 |

As shown in Table 8, each of Examples relating to the rubber-modified copolymer resin composition of the present invention, is excellent in transparency, impact resistance and rigidity and has little dependency of the transparency on molding conditions, and it is excellent in practical strength. As shown in Table 9, each of Comparative Examples which do not meet the conditions of the present invention, was poor in some physical property among transparency, impact resistance, rigidity, dependency of the transparency on molding conditions and practical strength.

Here, evaluation was made in accordance with the following methods.

(1) Volume mean particle diameter (dv) of rubber particles

From a photograph by a transmission electron microscope by an ultrathin specimen method of the resin dyed with osmic acid, particle diameters (=(long diameter+short diameter)/2) of about 1000 particles in the photograph were measured, and it was obtained as a mean particle diameter obtainable by the following Formula 5. For the measurement of the particle size diameters, an image-treating measuring apparatus KS300, manufactured by Carl Zeiss Vision Company was used.

Mean particle diameter=$\Sigma ni \cdot Di^4 / \Sigma ni \cdot Di^3$  Formula 5

(wherein ni is the number of rubber particles having a particle diameter Di)

Further, the dv75% diameter and the dv25% diameter were also obtained by organizing the particle diameters obtained by the above measurements by means of the image-treating measuring apparatus.

(2) The gel content and the swelling index were measured by the above-mentioned methods.

(3) Weight Average Molecular Weight (Mw)

Measured under the GPC measuring conditions as follows:

Name of apparatus: SYSTEM-21 Shodex (manufactured by SHOWA DENKO K.K.)

Column: Three columns of PL gel MIXED-B were connected in series

Temperature: 40° C.

Detection: Differential refractive index

Solvent: Tetrahydrofuran

Concentration: 2 mass % calibration curve: Prepared by means of standard polystyrene (PS) (manufactured by PL Company), and the weight average molecular weight was represented by the PS-calculated value.

(4) Transparency

By means of an injection molding machine (IS-50EPN) manufactured by Toshiba Machine Co., Ltd., a three-stepped plate having thicknesses of 1 mm, 2 mm and 3 mm was molded at a cylinder temperature of 200° C. or 230° C. By using the 2 mm portion of such a three-stepped plate, the total light transmittance and the haze were measured (unit: %) by means of HAZE meter (NDH-1001DP model), manufactured by NIPPON DENSHOKU INDUSTRIES CO., LTD.

(5) Impact Resistance

By means of an injection molding machine (IS-80CNV) manufactured by Toshiba Machine Co., Ltd., a test specimen of 12.7×64×6.4 mm was molded at a cylinder temperature of 200° C. By using this test specimen, the Izod impact strength was measured in accordance with ASTM D256 (unit: J/m).

(6) Rigidity

By means of an injection molding machine (IS-80CNV) manufactured by Toshiba Machine Co., Ltd., a test specimen of 12.7×127×6.4 mm was molded at a cylinder temperature of 200° C. By using this test specimen, the flexural modulus was measured in accordance with ASTM D790 (unit: MPa).

(7) Practical Strength

By means of an injection molding machine (IS-80CVN) manufactured by Toshiba Machine Co., Ltd., a three-stepped plate having thicknesses of 1 mm, 2 mm and 3 mm was molded at a cylinder temperature of 230° C. By using the 1 mm portion of this test specimen, the 50% breaking height was measured (unit: cm) by using a weight having a weight of 200 gf and having a forward end of 5R and a weight diameter of 14 mm.

INDUSTRIAL APPLICABILITY

The rubber-modified copolymer resin of the present invention is excellent in transparency, impact resistance and rigidity and has little dependency of the transparency on molding conditions.

Further, the rubber-modified copolymer resin composition of the present invention is excellent in transparency, impact resistance and rigidity and has little dependency of the transparency on molding conditions, and it further has high practical strength. Thus, it is useful for various applications including home electric appliances and packaging materials.

The invention claimed is:

1. A transparent rubber-modified copolymer resin composition, comprising:

a rubber-modified copolymer resin, or a mixture of two or more rubber-modified copolymer resins, said resin(s) obtained by copolymerizing a styrenic monomer and a (meth)acrylic ester monomer in the presence of a particulate rubbery polymer, wherein the rubber particles dispersed in the resin have a volume mean particle diameter (dv) ranging from 0.4 to 2.0 µm, and wherein the particles of rubber are such that in the cumulative rubber particle size distribution curve by volume, the difference between the diameter (d75) at an integrated value of 75% and the diameter (d25) at an integrated value of 25% ranges from 0.2 to 2.0 µm, the resulting resin composition being transparent.

2. The transparent rubber-modified copolymer resin according to claim 1, wherein, in the cumulative rubber particle size distribution curve by volume, rubber particles having particle diameters of less than 0.8 µm occupy from 95 to 30 vol % of all rubber particles, and rubber particles having particle diameters of at least 0.8 µm occupy from 5 to 70 vol % of all rubber particles.

3. The transparent rubber-modified copolymer resin according to claim 1 or 2, wherein the cumulative rubber particle size distribution curve by volume has at least one peak value at each of a particle diameter of less than 0.8 µm and a particle diameter of at least 0.8 µm.

4. The transparent rubber-modified copolymer resin according to claim 1, which has a gel content ranging from 5 to 25 wt %.

5. The transparent rubber-modified copolymer resin according to claim 1, which has a swelling index is ranging from 9 to 17.

6. The transparent rubber-modified copolymer resin according to claim 1, which has a weight average molecular weight (Mw) of 80,000 to 200,000.

7. A rubber-modified copolymer resin compositions comprising:
from 60 to 99.9 wt % of a transparent rubber-modified copolymer resin (A) or a mixture of at least two which is a rubber-modified copolymer resins (A), said resin(s) obtained by copolymerizing a styrenic monomer and a (meth)acrylic ester monomer in the presence of a particulate rubbery polymer, wherein the rubber particles dispersed in the resin have a volume mean particle diameter (dv) is ranging from 0.4 to 2.0 μm, and wherein the particles of rubber are such that in the cumulative rubber particle size distribution curve by volume, the difference between the diameter (d75) at an integrated value of 75% and the diameter (d25) at an integrated value of 25% ranges from 0.2 to 2.0 μm, and from 0.1 to 40 wt % of an emulsion graft copolymer (B).

8. The transparent rubber-modified copolymer resin composition according to claim 7, wherein, in the cumulative particle size distribution curve by volume of rubber particles dispersed in the transparent rubber-modified copolymer resin (A), rubber particles having particle diameters of less than 0.8 μm occupy from 95 to 30 vol % of the particles, and rubber particles having particle diameters of at least 0.8 μm occupy from 5 to 70 vol % of the particles.

9. The transparent rubber-modified copolymer resin composition according to claim 7 or 8, wherein the cumulative particle size distribution curve by volume of rubber particles dispersed in the transparent rubber-modified copolymer resin (A), has at least one peak value at each of a particle diameter of less than 0.8 μm and a particle diameter of at least 0.8 μm.

10. The rubber-modified copolymer resin composition according to claim 7, wherein the difference in the refractive indexes at a temperature of 25° C. of the transparent rubber-modified copolymer resin (A) and the emulsion graft copolymer (B), is less than 0.03.

11. The transparent rubber-modified copolymer resin according to claim 1, wherein the rubbery polymer of the particles is a polybutadiene rubber, a styrene/butadiene rubber, a styrene/butadiene block rubber, a partially hydrogenated polybutadiene, a partially hydrogenated styrene/butadiene rubber or a partially hydrogenated styrene/butadiene block rubber, and the viscosity of a 5 wt % styrene solution of the rubbery polymer at a temperature of 25° C. ranges from 15 to 200 mPa·s.

12. The transparent rubber-modified copolymer resin according to claim 1, wherein the amount of the rubbery polymer in the rubber-modified copolymer resin ranges from 0.1 to 30 parts by weight per 100 parts be weight of the total amount of styrenic and (meth)acrylic ester monomers in the copolymer.

13. The transparent rubber-modified copolymer resin according to claim 1, wherein, in the copolymer, the amount of the styrenic monomer ranges from 5 to 95 parts by weight and the amount of the (meth)acrylic ester monomer ranges from 95 to 5 parts by weight.

14. The transparent rubber-modified copolymer resin according to claim 7, wherein the rubbery polymer of the particles is a polybutadiene rubber, a styrene/butadiene rubber, a styrene/butadiene block rubber, a partially hydrogenated polybutadiene, a partially hydrogenated styrene/butadiene rubber or a partially hydrogenated styrene/butadiene block rubber, and the viscosity of a 5 wt % styrene solution of the rubbery polymer at a temperature of 25° C. ranges from 15 to 200 mPa·s.

15. The transparent rubber-modified copolymer resin according to claim 7, wherein the amount of the rubbery polymer in the rubber-modified copolymer resin ranges from 0.1 to 30 parts by weight per 100 parts by weight of the total amount of styrenic and (meth)acrylic ester monomers in the copolymer.

16. The transparent rubber-modified copolymer resin according to claim 7, wherein, in the copolymer, the amount of the styrenic monomer ranges from 5 to 95 parts by weight and the amount of the (meth)acrylic ester monomer ranges from 95 to 5 parts by weight.

* * * * *